United States Patent [19]

Ulmer et al.

[11] 4,407,783

[45] Oct. 4, 1983

[54] PRODUCING SILANE FROM SILICON TETRAFLUORIDE

[75] Inventors: Harry E. Ulmer, Morristown; Donald Pickens, Mendham; Forrest J. Rahl, Hackettstown; Philip A. Lefrancois, Cranford, all of N.J.

[73] Assignee: Allied Corporation, Morris Township, Morris County, N.J.

[21] Appl. No.: 408,408

[22] Filed: Aug. 16, 1982

[51] Int. Cl.$^3$ .............................................. C01B 33/04

[52] U.S. Cl. ..................................... 423/347; 423/341

[58] Field of Search ................................ 423/347, 341

[56] References Cited

U.S. PATENT DOCUMENTS

| | | | |
|---|---|---|---|
| 3,043,664 | 7/1962 | Mason et al. | 423/347 |
| 3,050,366 | 8/1962 | Ringwald | 423/347 |
| 3,419,354 | 12/1968 | Berger | 423/347 |

FOREIGN PATENT DOCUMENTS

| | | | |
|---|---|---|---|
| 235165 | 6/1959 | Australia | 423/347 |
| 52808 | 6/1982 | European Pat. Off. | |
| 909950 | 11/1962 | United Kingdom | |

OTHER PUBLICATIONS

Padma et al., J. Fluorine Chem. 14(4), pp. 327–329 (1979).

*Primary Examiner*—Jack Cooper

*Attorney, Agent, or Firm*—Alan M. Doernberg; Gerhard H. Fuchs; Kenneth E. Stroup, Jr.

[57] ABSTRACT

Silicon tetrafluoride is reacted with sodium hydride in a cyclic ether reaction medium such as tetrahydrofuran or 1,4-dioxane or in dimethoxyethane. Sodium aluminum hydride is dissolved in the solvent and catalyzes the reaction in amounts of 4–25%, by weight of combined sodium hydride and sodium aluminum hydride.

10 Claims, No Drawings

PRODUCING SILANE FROM SILICON TETRAFLUORIDE

BACKGROUND OF THE INVENTION

The present invention relates to the production of silane by reaction of silicon tetrafluoride with an alkali metal hydride.

While the production of silane from silicon tetrachloride has been known for many years, the corresponding reaction of silicon tetrafluoride appears in few references. The reaction of stoichiometric amounts of $LiAlH_4$ with $SiF_4$ in an ether solvent is reported by Padma et al. in *J. Fluorine Chem* 14(4) 327–29 (1979). British Pat. No. 909,950 (1962) reports reactions between alkali metal hydrides and silicon halides in ether solvents catalyzed by zinc salts, and alleges that silicon tetrafluoride is a suitable reactant.

Copending, commonly assigned U.S. Pat. No. 208,978 of Lefrancois (filed Nov. 21, 1980) and corresponding EPO Published Application No. 52,808 (June 2, 1982), report the reaction between silicon tetrafluoride and sodium hydride at high temperatures in selected aromatic ether solvents such as diphenyl ether. Poor yields are indicated for the same reactants in refluxing tetrahydrofuran. At the boiling point of diphenyl ether some yield loss of NaH to hydrogen gas is reported.

BRIEF DESCRIPTION OF THE INVENTION

It has been discovered that sodium aluminum hydride catalyzes the reaction between sodium hydride and silicon tetrafluoride. Accordingly, the present invention includes a process for producing silane which comprises reacting sodium hydride with silicon tetrafluoride in a solvent comprising a cyclic ether or dimethoxyethane having a boiling point between about 60° C. and about 110° C. in the presence of sodium aluminum hydride at a level wherein the fraction $$\frac{\text{weight } NaAlH_4}{\text{weight NaH} + \text{weight } NaAlH_4}$$

is between about 0.04 and about 0.25. Under similar conditions, lithium aluminum hydride does not appear to catalyze the reaction.

DETAILED DESCRIPTION OF THE INVENTION

The reactants in the present process are silicon tetrafluoride, sodium hydride and sodium aluminum hydride. The normal by-product is sodium fluosilicate, as indicated by the following net reaction:

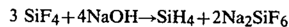

$$3\ SiF_4 + 4NaOH \rightarrow SiH_4 + 2Na_2SiF_6$$

but some cryolite ($Na_3AlF_6$) is also formed as the ultimate form of the aluminum introduced as $NaAlH_4$. It is possible that NaF may be the by-product under some conditions.

The molar ratios between total hydrides and silicon tetrafluoride are not critical, but it is preferred to perform the reaction under batch or continuous conditions such that the final unreacted hydride is minimized. It is also preferred, however, not to feed the silicon tetrafluoride (a gas) so quickly or so long that it becomes present in the product gas stream. The overall ratios to achieve this will depend upon how much $Na_2SiF_6$, $Na_3AlF_6$ and NaF are formed.

The reaction is conducted in a dry reaction medium containing a cyclic ether solvent or dimethoxyethane. The preferred cyclic ether is tetrahydrofuran, but other ethers such as 2-methyltetrahydrofuran (b.p. 78° C.), 3-methyltetrahydrofuran (b.p. 66° C.), 1,4-dioxane (b.p. 101.5° C.), 2-methylfuran (b.p. 63° C.) and 3-methylfuran (b.p. 66° C.) may be used. The reaction medium may also contain inert materials such as hydrocarbons. Besides cyclic ethers, only dimethoxyethane (sometimes called "glyme" or "monoglyme") has been shown to be effective (see Example 8, below). Since its boiling point (85.2° C.) is in the 60°–110° C. range, selected other acyclic ethers with similar boiling points may be effective alone, but thus far no such other acyclic ether has been found. Among the ethers which appear ineffective are ethyl diglyme (diethyl ether of diethylene glycol), tetraglyme (dimethyl ether of tetraethylene glycol), ethyl ether and butyl ether. While other acyclic ethers may also be present, cyclic ethers cannot be totally replaced by acyclic ethers, except in the case of dimethoxyethane. An example of a suitable partial replacement is 25% tetrahydrofuran with 75% ethyl ether. The amount of reaction medium required is that sufficient to make the reaction mixture susceptible to vigorous agitation.

Because sodium hydride is present during reaction primarily as a solid, and because the by-product fluorides are also primarily solids with low solubility in the reaction medium, vigorous agitation (high shear) is recommended to ensure that fresh sodium hydride surface is available for reaction. That agitation normally takes the form of rapid stirring with high peripheral velocities, but may take various other conventional forms, including the use of attriting agents.

It has been found that a minimum amount of sodium aluminum hydride (soluble in the reaction medium) is required to both produce silane and cause sodium hydride to participate in the reaction. As indicated by Comparative Example B, below, lesser amounts of sodium aluminum hydride may react itself with silicon tetrafluoride to form silane, but the reaction will not utilize the less expensive sodium hydride.

The minimum proportion is expressed above as the percent $NaAlH_4$ by weight of NaH plus $NaAlH_4$ being between about 0.04 and about 0.25. The minimum is that necessary for NaH to react; the maximum is dictated only by expense. The preferred range is between about 0.04 and about 0.10.

In batch-type reactions, silicon tetrafluoride is fed into the agitated slurry of $NaAlH_4$ and NaH and cyclic ether. In continuous reactions, sodium hydride (generally as a slurry in cyclic ether) with some $NaAlH_4$ is also continuously fed in, with the byproduct fluoride salts removed. If the reaction is conducted under conditions of refluxing solvent, the product gas after removal of solvent vapors (e.g. by condensation and/or carbon bed absorption) will include mainly silane and some by-product hydrogen. If a diluent (e.g. hydrogen) is introduced with the silicon tetrafluoride, the diluent will be mixed with silane in the product gas. Pressure is not critical, with atmospheric pressure being preferred. Superatmospheric pressures with reflux may raise the reaction temperatures and therefore increase NaH decomposition to hydrogen. For the present reaction, temperature conditions of 0° C. up to refluxing cyclic ether (e.g. 66° C. at atmospheric pressure for tetrahydrofuran) may be used. Preferred temperature conditions include 20°–45° C. and include refluxing solvent temperatures.

EXAMPLES

The apparatus used for Examples 1–3 and 6–10 (and Comparative Examples A thru E) of this application was essentially the same used in Ser. No. 208,978 of Lefrancois, now U.S. Pat. no. 4,374,111. Thus, the following examples were conducted in the laboratory apparatus shown in the Figure shown in Ser. No. 208,978. A tank of silicon tetrafluoride (reagent grade) is connected through a molecular sieve drier and a flow controller to a reactor. A glass reactor of generally cylindrical shape is surrounded by an electric heating mantle and is fitted with the inlet tube for the silicon tetrafluoride terminating near the bottom of the reaction zone. A cruciform stirrer (three quarter inch or 19 mm diameter) was located in the reaction zone and driven by a motor through a bearing and special 24/40 joint constructed of stainless steel with two neoprene O-rings and containing PTFE-glass gaskets. The bearing and joint were water-cooled. The motor speed was monitored periodically and adjusted to the desired speed (5,000 rev/min) by adjusting a voltage regulator. The reactor was connected through a water cooled condenser to a manual sampling valve and then to a kerosene filled wet test meter for a determination of gas volume. The effluent from the wet test meter was vented to the atmosphere and was observed to self-ignite in many runs. The valve was connected to a Varian gas chromatograph (Model 3700) with a 7.0 meter length, 3.2 mm outside diameter Porapak PS column so as to entrain a 0.5 mL gas sample in a neon carrier gas into the column. Varian is a trademark of Varian Associates. Porapak is a trademark of Waters Associates. The column was operated at a constant 35° C. temperature. In this operating mode major peaks were detected by thermal conductivity at 0.9–1.2 min (hydrogen and nitrogen), 1.3–1.5 min (silicon tetrafluoride) and at 2.3–2.8 min (silane). In a few of the Examples, a small peak was also observed eluting after silane that could be $Si_2H_6$.

In each run, data was taken periodically including: stirrer speed, pressures and flow rates, pressure after the condenser, temperature in the reaction vessel by an iron-constantan thermocouple connected to a recorder, cumulative volume at the wet test meter, curves and integrations for peaks at least 0.01 area % and time. The temperatures given are accurate to within two degrees. Only some of this data is reported in the following text.

In Examples 4 and 5 the above apparatus was modified for continuous operation as follows. An inlet for slurry of NaH plus $NaAlH_4$ in THF entered near the bottom of the reactor. This slurry was fed into the reactor using an one-quarter inch (6.35 mm) stainless steel piston, ceramic cylinder FMI pump (model RRP-SYX) from an agitated slurry tank. An overflow line allowed excess slurry to pass into a receiver flask, provided with an agitator and a valve on the bottom to remove slurry periodically. Gas passed into the same line from the condenser.

EXAMPLE 1

Using the above apparatus, a 400 mL reactor was charged with 200 mL tetrahydrofuran, 8.34 g of a sodium hydride-mineral oil mixture (63.5% or 5.296 g NaH) and 5 mL (4.60 g) of a 12.47% solution of sodium aluminum hydride in tetrahydrofuran (0.574 g $NaAlH_4$). Thus the $NaAlH_4$ represented 9.78% of the combined NaH plus $NaAlH_4$, by weight.

With the agitator at about 5000 rev/min (varying between 4600 and 5300 over the run) the reaction mixture at 25.7° C. and the system at essentially atmospheric pressure, a flow of silicon tetrafluoride at about 40 $cm^3$/min (0° C., 101.3 kPa) was started, which was held throughout the run.

Analysis of gas samples approximately every five minutes revealed the area percentage shown in Table 1. During the first 20 minutes, nitrogen gas originally in the system was present in the gas samples, but the analyses were calculated on a nitrogen-free basis.

TABLE 1

| Time (Minutes from Start of $SiF_4$) | Temperature (°C.) | Area Percentages In Product Gases | | |
|---|---|---|---|---|
| | | $H_2$ | $SiF_4$ | $SiH_4$ |
| 4 | 30.2 | 65.6 | 0 | 34.4 |
| 9 | 34.1 | 64.2 | 0 | 35.8 |
| 14 | 37.6 | 37.5 | 0 | 62.5 |
| 18 | 40.6 | 14.8 | 0 | 85.2 |
| 23 | 43.5 | 22.3 | 0 | 77.7 |
| 28 | 45.9 | 10.9 | 0 | 89.1 |
| 33 | 48.0 | 6.6 | 0 | 93.4 |
| 38 | 49.9 | 2.9 | 0 | 97.1 |
| 45 | 51.2 | 16.3 | 0 | 83.7 |
| 50 | 52.1 | 15.8 | 0 | 84.2 |
| 56 | 53.1 | 15.8 | 0 | 84.2 |
| 61 | 53.7 | 7.9 | 0 | 92.1 |
| 66 | 54.3 | 8.2 | 0 | 91.8 |
| 72 | 54.8 | 10.7 | 0 | 89.3 |
| 78 | 55.2 | 11.2 | 0 | 88.8 |
| 83 | 55.3 | 11.0 | 0 | 89.0 |
| 87 | 53.9 | 8.3 | 0 | 91.7 |
| 91 | 51.4 | 9.0 | 0 | 91.0 |
| 98 | 47.8 | 8.1 | 72.9 | 19.0 |

EXAMPLE 2

Example 1 was repeated using 200 mL dry tetrahydrofuran, 9.4 g of a sodium hydride mineral oil paste (56.2% or 5.27 g NaH) and 2.0 mL (1.84 g) of 12.47% $NaAlH_4$ in tetrahydrofuran. Thus the $NaAlH_4$ represented 4.2% of the total NaH plus $NaAlH_4$, by weight.

With the agitator at about 5000 rev/min (varying between 4700 and 5300 over the run), the temperature at 27.1° C. and the system at about atmospheric pressure, a flow of silicon tetrafluoride about 40 $cm^3$/min (0° C., 101.3 kPa) was started. Results of analysis of the product gas about every five minutes is shown in Table 2. Nitrogen was present in the system originally.

TABLE 2

| Time (min) | Temp (°C.) | Area Percentages | | | |
|---|---|---|---|---|---|
| | | $H_2$ | $SiF_4$ | $SiH_4$ | $N_2$ |
| 17 | 40.6 | 9.3 | 0 | 17.9 | 72.8 |
| 22 | 44.3 | 67.2($N_2$) | 0 | 32.8 | — |
| 27 | 46.2 | 45.6($N_2$) | 0 | 54.4 | — |
| 32 | 47.0 | 6.1 | 0 | 70.5 | 23.4 |
| 37 | 50.2 | 6.1 | 0 | 81.3 | 12.6 |
| 42 | 53.5 | 5.3 | 0 | 89.0 | 5.7 |
| 47 | 57.4 | 4.6 | 0 | 92.4 | 3.0 |
| 52 | 59.7 | 3.9 | 0 | 94.0 | 2.1 |
| 57 | 60.8 | 4.0 | 0 | 94.2 | 1.8 |
| 62 | 61.7 | 4.5 | 0 | 93.7 | 1.8 |
| 67 | 61.4 | 5.5 | 0 | 93.1 | 1.4 |
| 72 | 61.5 | 7.0 | 0 | 91.4 | 1.6 |
| 77 | 62.0 | 8.7 | 0 | 90.3 | 1.0 |
| 82 | 60.3 | 9.5 | 0 | 89.4 | 1.1 |
| 87 | 58.8 | 11.2 | 21.3 | 67.0 | — |
| 92 | 58.7 | 1.7 | 95.6 | 2.4 | 0.3 |

Addition of water to an aliquot of the final slurry released very little gas, indicating a very low residual NaH.

EXAMPLE 3

Example 1 was repeated using 200 mL tetrahydrofuran, 8.3 g of 58.1% sodium hydride-mineral oil paste (4.822 g NaH) and 2 g of 12.47% sodium aluminum hydride in THF (0.249 g $NaAlH_4$). Thus $NaAlH_4$ was 4.91% of NaH plus $NaAlH_4$ by weight.

With the agitator at about 5000 rev/min (varying between 4700 and 5200 over the run), the temperature at 20.9° C. and the system at about atmospheric pressure, a flow of about 40 $cm^3$/min silicon tetrafluoride was started. The results of analyzing the product gas about every six minutes is shown in Table 3.

TABLE 3

| Time (min) | Temp (°C.) | Area Percentages | | | Other |
|---|---|---|---|---|---|
| | | $H_2$ | $SiF_4$ | $SiH_4$ | * |
| 9 | 22.6 | 96.4 | 2.5 | 1.0 | 2 |
| 15 | 21.3 | 84.6 | 9.7 | 5.3 | 1 |
| 21 | 41.1 | 46.1 | 17.8 | 36.2 | 0 |
| 27 | 44.3 | 24.9 | 13.7 | 52.9 | 1 |
| 33 | 46.9 | 26.9 | 0 | 73.1 | 0 |
| 39 | 4818 | 18.2 | 0 | 81.8 | 0 |
| 45 | 50.5 | 16.4 | 0 | 83.6 | 0 |
| 51 | 51.8 | 19.1 | 0 | 80.9 | 0 |
| 57 | 52.8 | 24.2 | 0 | 75.8 | 0 |
| 63 | 53.2 | 13.2 | 0 | 86.8 | 0 |
| 69 | 53.7 | 13.0 | 0 | 87.0 | 0 |
| 75 | 54.0 | 12.2 | 0 | 87.6 | 1 |
| 81 | 52.5 | 10.7 | 0 | 88.1 | 1 |
| 87 | 50.4 | 6.0 | 71.1 | 22.7 | 2 |
| 92 | 48.7 | 4.5 | 87.3 | 8.0 | 1 |
| 99 | 42.1 | 3.9 | 93.2 | 2.9 | 0 |
| 105 | 45.7 | 3.1 | 95.6 | 1.3 | 0 |

*other peaks adding up to 100%

After shut-down, the reactor contents (188.2 g) were filtered, and the wet cake (33.2 g) dried for one hour at 110° C. to produce an 18.6 g sample. Analysis of an aliquot showed $Na_2SiF_6$ by x-ray diffraction as the primary product.

COMPARATIVE EXAMPLE A

The procedure of Example 1 was repeated using 200 mL of THF, 8.3 g of sodium hydride-mineral oil paste (58.1% or 4.82 g NaH) and 1 g of 12.47% $NaAlH_4$ in THF (0.125 g $NaAlH_4$). Thus $NaAlH_4$ was 2.52% of NaH plus $NaAlH_4$. Starting at 24.3° C., the product gas was measured every 5–7 minutes, but the silane peak never exceeded five area percent. The temperature reached 60° C. by the end of this run.

COMPARATIVE EXAMPLE B

The procedure of Example 1 repeated using 200 mL of THF, 8.3 g of the 58.1% NaH and 1.5 grams of the 12.47% $NaAlH_4$, for a $NaAlH_4$ proportion of 3.74% by weight of NaH plus $NaAlH_4$. The results are shown in Table 4. Up to three other peaks were observed throughout. The results suggest that the small amount of $NaAlH_4$ reacted, but was ineffective to catalyze NaH reaction.

TABLE 4

| Time (min) | Temp (°C.) | Area Percentages | | |
|---|---|---|---|---|
| | | $H_2$ | $SiF_4$ | $SiH_4$ |
| 12 | 28.2 | 63.2 | 34.1 | 2.7 |
| 18 | 29.0 | 30.4 | 48.0 | 20.6 |
| 24 | 29.7 | 21.5 | 61.3 | 14.1 |
| 30 | 32.4 | 6.5 | 85.2 | 7.2 |

TABLE 4-continued

| Time (min) | Temp (°C.) | Area Percentages | | |
|---|---|---|---|---|
| | | $H_2$ | $SiF_4$ | $SiH_4$ |
| 36 | 38.5 | 5.5 | 92.1 | 2.0 |
| 42 | 44.3 | 4.9 | 93.3 | 1.5 |
| 48 | 49.4 | 4.6 | 94.0 | 1.2 |
| 55 | 54.0 | 3.0 | 95.8 | 1.0 |
| 62 | 56.9 | 2.8 | 96.4 | 0.8 |
| 69 | 58.9 | 3.1 | 96.3 | 0.5 |
| 75 | 59.7 | 2.2 | 97.4 | 0.4 |

COMPARATIVE EXAMPLE C

The procedures of Example 1 were followed using 190 mL dry tetrahydrofuran, 9.11 g of sodium hydride-mineral oil paste (58.5% or 5.32 g NaH) and 21.2 mL of one molar lithium aluminum hydride (0.0212 mol or 0.81 g $LiAlH_4$). Thus, $LiAlH_4$ represented 13.2% of the combined NaH and $LiAlH_4$.

With the agitator at about 5000 rev/min (varying between about 4700 and 5550 during the run), the temperature at 24.8° C. and the system at atmospheric pressure, a flow of silicon tetrafluoride about 41 $cm^3$/min/0° C., 101 kPa) was started. Results of analyses of the product gas about every five minutes (on a nitrogen-free basis) are shown in Table 5.

TABLE 5

| Time (min) | Temp (°C.) | Area Percentages | | |
|---|---|---|---|---|
| | | $H_2$ | $SiF_4$ | $SiH_4$ |
| 7 | 41.6 | — | — | 4.85* |
| 12 | 61.5 | 4 | 0 | 93 |
| 17 | 63.6 | 5 | 0 | 95 |
| 22 | 63.3 | 4 | 0 | 95 |
| 27 | 62.7 | 7 | 70 | 8 |
| 35 | 62.0 | 2 | 94 | 1 |

*as a percentage of total gas - difficult to separate hydrogen and nitrogen.

The results indicate that the $LiAlH_4$ reacted to convert $SiF_4$ to $SiH_4$, but failed to catalyze any NaH reaction. A similar experiment with 0.41 g $LiAl_4$ and 5.33 g NaH (or $LiAlH_4$ at 7.1% of combined $LiAlH_4$ and NaH) produced high silane for only one reading (at 12 minutes), indicating a similar activity of the $LiAlH_4$ to react but not catalyze.

EXAMPLE 4

Example 1 was repeated using the apparatus described for continuous operation above. The initial reaction mixture and slurry used for continuous feed were as follows:

| Material | Initial | Feed Slurry |
|---|---|---|
| Tetrahydrofuran | 550 mL | 1200 mL |
| 58.05% NaH (in MO) | 27.5 g | 120 g |
| 12.47% $NaAlH_4$ (in THF) | 7.6 mL (6.4 g) | 30 mL (25.3 g) |
| $NaAlH_4$ (g) | 0.798 | 3.15 |
| NaH (g) | 15.96 | 69.66 |
| % $NaAlH_4$ | 4.76 | 4.33 |

After charging the initial slurry and turning on the heater, silicon tetrafluoride flow was started with the slurry at 47.3° C. At 90 minutes into the run, slurry feed was initiated at a rate of about 5.4 g/min, except for the period from 263 to 268 minutes into the run (when the pump was being repaired). The silicon tetrafluoride feed was gradually raised as follows:

| Time | Flowmeter | $Cm^3$/min |
|---|---|---|
| Initial | 690 | 75.5 |
| 91 min | 790 | 86 |
| 222 min | 850 | 92.5 |
| 262 min | 900 | 98 |
| 307 min | 980 | 106 |

The feed slurry pump was turned off at 321 minutes and the silicon tetrafluoride at 367 minutes. Product gas was analyzed by gas chromatography every ten minutes (as illustrated in Table 6) and overflow slurry was collected when about 70–100 g had accumulated in the receiver. The amounts collected are also indicated in Table 6. No $SiF_4$ was detected in the product gas, except at the final reading.

TABLE 6

| | | Area Percent | | Liquid |
|---|---|---|---|---|
| Time (min) | Temp (°C.) | $H_2$ | $SiH_4$ | Overflow (g) |
| 10 | 61.4 | 88.5 | 0 | |
| 20 | 63.0 | 9.8 | 90.2 | — |
| 30 | 63.2 | 10.3 | 89.7 | — |
| 40 | 63.3 | 17.7 | 82.3 | — |
| 50 | 63.3 | 10.5 | 89.5 | — |
| 60 | 63.3 | 10.5 | 89.5 | — |
| 70 | 63.4 | 9.0 | 91.0 | — |
| 80 | 63.5 | 9.4 | 80.6 | — |
| 90 | 63.6 | 9.1 | 90.9 | — |
| 97 | 63.4 | — | — | 76.0 |
| 100 | 62.9 | 17.0 | 83.0 | — |
| 110 | 62.7 | 15.7 | 84.3 | — |
| 111 | 62.7 | — | — | 93.4 |
| 120 | 62.7 | 9.8 | 90.2 | — |
| 127 | 62.7 | — | — | 82.2 |
| 130 | 62.7 | 19.7 | 80.3 | — |
| 140 | 62.9 | 11.4 | 88.6 | — |
| 141 | — | — | — | 87.0 |
| 150 | 63.0 | 17.8 | 82.2 | — |
| 157 | — | — | — | 83.2 |
| 160 | 62.5 | 10.5 | 89.5 | — |
| 170 | 62.5 | 19.5 | 80.5 | — |
| 172 | — | — | — | 92.7 |
| 180 | 62.7 | 12.4 | 87.6 | — |
| 186 | — | — | — | 83.0* |
| 190 | 62.9 | 10.1 | 89.9 | — |
| 200 | 62.6 | 10.4 | 89.6 | — |
| 206 | — | — | — | 96.4 |
| 210 | 63.0 | 9.8 | 90.2 | — |
| 220 | 62.8 | 11.0 | 89.0 | — |
| 222 | — | — | — | 87.4 |
| 230 | 62.7 | 10.5 | 89.5 | — |
| 235 | — | — | — | 75.6 |
| 240 | 62.7 | 18.6 | 81.4 | — |
| 250 | 62.7 | 19.1 | 80.9 | — |
| 251 | — | — | — | 90.1 |
| 260 | 62.7 | 12.0 | 88.0 | — |
| 270 | — | — | — | 83.7 |
| 275 | 63.4 | 10.0 | 90.0 | — |
| 285 | 63.5 | 17.6 | 82.4 | — |
| 295 | 63.5 | 9.7 | 90.3 | — |
| 296 | — | — | — | 74.7 |
| 305 | 63.5 | 9.2 | 90.8 | — |
| 315 | 63.6 | 13.3 | 86.7 | — |
| 322 | — | — | — | 70.9* |
| 325 | 63.3 | 7.4 | 92.6 | — |
| 335 | 63.6 | 6.3 | 93.7 | — |
| 345 | 63.6 | 5.9 | 93.6 | — |
| 355 | 63.6 | 6.0 | 94.0 | — |
| 365 | 59.6 | 1.1 | 2.8** | — |

*the 83.0 g at 186 minutes showed 2.24% NaH by hydrogen evolution; the 70 g at 322 minutes showed 1.60% NaH by hydrogen evolution

**At 365 minutes $SiF_4$ was 94.6 area percent; the feed slurry pump was shut off at 321 minutes.

EXAMPLE 5

The procedure of Example 4 was repeated using the following feeds:

| Material | Initial | Feed Slurry |
|---|---|---|
| Tetrahydrofuran | 550 mL | 600 mL |
| 58.05% NaH (in MO) | 27.5 g | 60 g |
| 12.47% $NaAlH_4$ (in THF) | 7.6 mL | 15 mL |
| NaH | 15.96 g | 34.83 g |
| $NaAlH_4$ | 0.798 g | 1.58 g |
| % $NaAlH_4$ | 4.76 | 4.33 |

After charging the initial slurry at 20.7° C., the heaters were turned on and the $SiF_4$ feed started with the slurry at 40.9° C. At 97 minutes into the run, the feed slurry was started at a rate of 2.75 g/min. At 241 minutes, the slurry feed was shut off. At 98 minutes into the run, $SiF_4$ feed rate was raised from 75 $cm^3$/min to 108 $cm^3$/min. The results are displayed in Table 7.

TABLE 7

| | | Area Percent | | Liquid |
|---|---|---|---|---|
| Time (min) | Temp (°C.) | $H_2$ | $SiH_4$ | Overflow (g) |
| 6 | 40.9 | — | — | — |
| 11 | 51.0 | 4.9 | 0 | — |
| 17 | 54.4 | 23.0 | 32.2 | — |
| 25 | 56.4 | 21.8 | 78.2 | — |
| 31 | 57.3 | 16.8 | 83.2 | — |
| 40 | 59.9 | 9.1 | 90.9 | — |
| 50 | 62.7 | 9.9 | 90.1 | — |
| 60 | 63.4 | 10.5 | 89.2 | — |
| 70 | 63.6 | 11.5 | 88.5 | — |
| 90 | 63.7 | 12.1 | 87.5 | — |
| 100 | 63.7 | 10.6 | 89.0 | — |
| 105 | — | — | — | 78.7 |
| 110 | 63.4 | 12.7 | 86.7 | — |
| 120 | 63.7 | 10.3 | 88.2 | — |
| 130 | 63.6 | 8.4 | 91.1 | — |
| 131 | — | — | — | 79.5 |
| 140 | 63.4 | 13.0 | 86.5 | — |
| 150 | 63.8 | 3.2 | 96.1 | — |
| 160 | 63.8 | 10.9 | 88.6 | 83.6 |
| 170 | 63.7 | 10.2 | 89.3 | — |
| 180 | 63.8 | 11.3 | 87.9 | — |
| 187 | — | — | — | 74.5 |
| 190 | 63.7 | 10.7 | 88.6 | — |
| 200 | 63.7 | 10.1 | 89.1 | — |
| 210 | 63.5 | 9.8 | 89.5 | — |
| 212 | — | — | — | 80.8 |
| 220 | 63.5 | 10.1 | 89.2 | — |
| 230* | 63.5 | 8.8 | 90.5 | 50.6 |
| 240 | 63.5 | 8.1 | 91.2 | — |
| 246 | 63.4 | 8.1 | 91.1 | — |
| 254 | 62.3 | 6.2 | 91.1 | — |
| 262 | 59.4 | 3.2 | 2.5 | — |

*NaH.$NaAlH_4$ slurry feed was shut off at 230 min.

Analyses of selected overflow materials indicated 0.256% NaH at 131 minutes, 0.418% NaH at 187 minutes and 0.660% NaH at 230 minutes. Analysis of the final reaction mixture at 262 minutes indicated 0.181% NaH. Analysis of $SiF_4$ in the product gas at 262 minutes was 91.9%.

EXAMPLE 6

Following the procedures of Example 1, the reactor was charged with 200 mL of 1,4-dioxane, 9.4 g of 56.2% NaH in mineral oil and 4 g of 12.47% $NaAlH_4$ in tetrahydrofuran. The silicon tetrafluoride flow was 41 $cm^3$/min. Thus $NaAlH_4$ represented 8.63% of NaH plus $NaAlH_4$. The results are displayed in Table 8, on a nitrogen-free basis.

TABLE 8

| Time (min) | Temp (°C.) | Area Percentages | | |
|---|---|---|---|---|
| | | $H_2$ | $SiF_4$ | $SiH_4$ |
| 0 | 27.4 | — | — | — |
| 6 | 42.2 | — | — | — |
| 12 | 68.5 | — | — | * |
| 18 | 91.5 | 3 | — | 97 |
| 24 | 95.2 | 2 | — | 98 |
| 30 | 95.0 | 7 | — | 92 |
| 36 | 95.1 | 11 | — | 88 |
| 72 | 95.1 | 8 | — | 91 |
| 48 | 94.9 | 7 | — | 92 |
| 54 | 94.8 | 7 | — | 92 |
| 60 | 94.8 | 7 | — | 92 |
| 66 | 94.9 | * | — | 93 |
| 72 | 94.9 | 7 | — | 92 |
| 78 | 95.0 | 9 | — | 91 |
| 84 | 94.8 | 10 | — | 88 |
| 90 | 94.8 | 21 | 17 | 60 |
| 93 | | silicon tetrafluoride shut off | | |
| 96 | 85.5 | 12 | 7 | 77 |
| 102 | 72.9 | 9 | 72 | 12 |
| 108 | 63.2 | * | 10 | 2 |

At 12, 66 and 108 minutes, the hydrogen peak was not sufficiently distinct from the nitrogen peak to provide reliable separate estimates. The results displayed in Table 8 indicate that essentially all of the $NaAlH_4$ and NaH had reacted to form silane. Based upon the amount of $SiF_4$ absorbed, the probable by-product was $Na_2SiF_6$.

EXAMPLE 7

Example 6 was repeated using 9.4 g of 56.2% NaH and 2 g of 12.47% $NaAlH_4$. The presence of 30–60% $SiF_4$ in the effluent between 35 minutes and 66 minutes into the run indicated lower activity, but still some catalysis to convert NaH (about 45% of that charged) to silane. Thus, the use of 4.51% $NaAlH_4$ (basis NaH plus $NaAlH_4$) in dioxane was less effective than the 8.63% used in Example 6, also in dioxane. The results were also somewhat poorer than the 4.2% $NaAlH_4$ (basis NaH plus $NaAlH_4$) in tetrahydrofuran in Example 2, but still evidenced a catalytic effect.

COMPARATIVE EXAMPLE D

Example 6 was repeated using 200 mL dioxane and 9.4 g of 56.2% of NaH (no $NaAlH_4$). Less than 1% silane (if any) was produced.

COMPARATIVE EXAMPLE E

Example 1 was repeated charging 200 mL diethyl ether, 9.4 g of 56.2% NaH (in mineral oil) and 2 g 12.47% $NaAlH_4$ (in tetrahydrofuran). Small amounts of silane (no more than 20% of effluent gas) were observed in the first few samples taken, but within 30 minutes silane was under one area percent of the effluent gas analyzed. Thus, in diethyl ether, 4.51% $NaAlH_4$ (basis $NaAlH_4$ plus NaH) was not catalytic, but only appeared to react itself to produce small amounts of silane.

EXAMPLE 9

Example 1 was repeated charging 200 mL dimethoxyethane, 9.4 g of 56.2% NaH (in mineral oil) and 4 g of 12.47% $NaAlH_4$ (in tetrahydrofuran). Silane was produced throughout the run as the temperature increased on heating from 27.3° C. initially to 55.0° C. after 43 minutes to 65.5° C. after 78 minutes. The silane replaced nitrogen as the major component of the effluent over the first 20–30 minutes, and thereafter represented 50–92 area percent of the analyzed gas until silicon tetrafluoride breakthrough occurred at 97–107 minutes. Between 58 minutes and 93 minutes into the run, the product gas analyzed as 7–10% hydrogen and 88–92% silane on a nitrogen-free basis. This demonstrates that 8.63% $NaAlH_4$ (basis NaH plus $NaAlH_4$) was effective in dimethoxyethane to catalyze NaH conversion to silane.

COMPARATIVE EXAMPLE F

Example 9 was repeated using the dimethyl ether of tetraethylene glycol (tetraglyme) in place of dimethoxyethane. In spite of a temperature profile from 26.5° C. up to 260.8° C. over two hours, the silane (35, 20 and 10 area percent at 17, 22 and 27 minutes) never became the major component of the effluent, but instead silicon tetrafluoride predominated. Thus 8.63% $NaAlH_4$ (basis NaH plus $NaAlH_4$) was ineffective as a catalyst, but only resulted in small amounts of silane attributable to direct reaction of $NaAlH_4$.

EXAMPLE 10

Example 1 was repeated using a mixed solvent of 25% tetrahydrofuran and 75% diethyl ether. Silane was produced in reasonably good yields throughout the run.

We claim:

1. A process for producing silane which comprises reacting sodium hydride with silicon tetrafluoride in a solvent comprising a cyclic ether or dimethoxyethane having a boiling point between about 60° C. and about 110° C. in the presence of sodium aluminum hydride at a level wherein the fraction $$\frac{\text{weight } NaAlH_4}{\text{weight NaH} + \text{weight } NaAlH_4}$$

is between about 0.04 and about 0.25.

2. The process of claim 1 wherein the cyclic ether solvent is tetrahydrofuran.

3. The process of claim 1 wherein the cyclic ether solvent is 1,4-dioxane.

4. The process of claim 1 or 2 or 3 wherein said fraction is between about 0.04 and about 0.10.

5. The process of claim 1 wherein the $Na_2SiF_6$ by product of said reaction is recovered and acidified to produce additional silicon tetrafluoride.

6. The process of claim 1 wherein the $Na_2SiF_6$ by-product of said reaction is recovered and thermally decomposed to produce additional silicon tetrafluoride.

7. The process of claim 1 wherein the $Na_2SiF_6$ by-product of said reaction is recovered and reacted with HF to produce additional silicon tetrafluoride.

8. The process of claim 1 or 2 or 3 being conducted under conditions of refluxing cyclic ether.

9. The process of claim 1 or 2 being conducted at a temperature between about 20° C. and about 45° C.

10. The process of claim 1 wherein said solvent is dimethoxyethane.

* * * * *